(12) United States Patent
Amacker et al.

(10) Patent No.: US 11,182,658 B1
(45) Date of Patent: Nov. 23, 2021

(54) MACHINE-READABLE CODE RENDERING DEVICE AND METHODS FOR USING THE SAME

(71) Applicant: Amazon Technologies, Inc., Seattle, WA (US)

(72) Inventors: Matthew W. Amacker, San Jose, CA (US); Howard S Kapustein, Issaquah, WA (US); Lawrence Arnold Lynch-Freshner, Boulder Creek, CA (US); Syam Sundar Pannala, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/685,406

(22) Filed: Apr. 13, 2015

Related U.S. Application Data

(62) Division of application No. 12/059,470, filed on Mar. 31, 2008, now Pat. No. 9,004,354.

(51) Int. Cl.
*G06K 19/06* (2006.01)
*G06K 7/10* (2006.01)

(52) U.S. Cl.
CPC .... *G06K 19/06112* (2013.01); *G06K 7/10544* (2013.01)

(58) Field of Classification Search
CPC ............................ G06K 7/00; G06K 10/10544
See application file for complete search history.

(56) References Cited

U.S. PATENT DOCUMENTS

| 6,253,190 | B1 | 6/2001 | Sutherland | |
|---|---|---|---|---|
| 6,269,342 | B1 | 7/2001 | Brick et al. | |
| 6,429,776 | B1* | 8/2002 | Alicot | G06K 1/18 235/462.01 |
| 6,493,110 | B1 | 12/2002 | Roberts | |
| 6,753,830 | B2 | 6/2004 | Gelbman | |
| 7,156,306 | B1 | 1/2007 | Kenney | |
| 2002/0062263 | A1* | 5/2002 | Katou | G06Q 10/087 705/22 |
| 2002/0117544 | A1 | 8/2002 | Wolf et al. | |
| 2003/0115152 | A1* | 6/2003 | Flaherty | G06K 7/1095 705/65 |
| 2003/0158796 | A1* | 8/2003 | Balent | G06Q 10/087 705/28 |
| 2003/0163384 | A1* | 8/2003 | Hendra | G06Q 30/06 705/27.1 |
| 2005/0108096 | A1* | 5/2005 | Burger | G06F 21/32 705/14.38 |

(Continued)

OTHER PUBLICATIONS

Office Action for U.S. Appl. No. 12/059,470, dated Dec. 19, 2013, Matthew W. Amacker, "Machine-Readable Code Rendering Device and Methods for Using the Same", 16 pages.

(Continued)

*Primary Examiner* — Christopher Stanford
(74) *Attorney, Agent, or Firm* — Lee & Hayes, P.C.

(57) ABSTRACT

A machine-readable code rendering device may include an electronic paper display and a machine-readable code rendering module that dynamically renders machine-readable codes on the electronic paper display. The electronic paper display may be configured so that the machine-readable codes are read by a light-based code reader off of the electronic paper display.

20 Claims, 10 Drawing Sheets

(56) References Cited

U.S. PATENT DOCUMENTS

| | | |
|---|---|---|
| 2005/0122564 A1 | 6/2005 | Zehner et al. |
| 2005/0160014 A1* | 7/2005 | Moss ................ G06Q 30/00 705/26.61 |
| 2005/0211771 A1 | 9/2005 | Onozu |
| 2005/0247797 A1 | 11/2005 | Ramachandran |
| 2006/0206709 A1 | 9/2006 | Labrou et al. |
| 2007/0022058 A1 | 1/2007 | Labrou et al. |
| 2007/0063844 A1 | 3/2007 | Jenney et al. |
| 2007/0168282 A1 | 7/2007 | Giordano |
| 2007/0215687 A1* | 9/2007 | Waltman ............ G06Q 20/10 235/379 |
| 2008/0140520 A1* | 6/2008 | Hyder ............... G06Q 20/342 705/14.1 |
| 2008/0154714 A1* | 6/2008 | Liu .................. G06Q 30/02 705/14.25 |
| 2008/0249836 A1* | 10/2008 | Angell ............... G06Q 30/02 705/14.5 |
| 2009/0089158 A1* | 4/2009 | Noll ................ G06Q 30/0254 705/14.52 |
| 2009/0125394 A1 | 5/2009 | Otto et al. |

OTHER PUBLICATIONS

Final Office Action for U.S. Appl. No. 12/059,470, dated May 22, 2014, Matthew W. Amacker, "Machine-Readable Code Rendering Device and Methods for Using the Same", 11 pages.

Office action for U.S. Appl. No. 12/059,470, dated Jul. 24, 2013, Amacker et al., "Machine Readable Code Rendering Device and Methods for Using the Same", 21 pages.

\* cited by examiner

MACHINE-READABLE CODE RENDERING DEVICE AND METHODS FOR USING THE SAME

CROSS REFERENCE TO RELATED APPLICATIONS

This application is a divisional of and claims priority to U.S. patent application Ser. No. 12/059,470, filed Mar. 31, 2008, entitled "Machine-Readable Code Rendering Device and Methods For Using the Same," which is incorporated herein by reference.

TECHNICAL FIELD

The present disclosure relates generally to computers and computer-related technologies. More specifically, the present disclosure relates to a machine-readable code rendering device and methods for using the same.

BACKGROUND

Electronic distribution of information has gained in importance with the proliferation of personal computers and has undergone a tremendous upsurge in popularity as the Internet has become widely available. With the widespread use of the Internet, it has become possible to distribute large, coherent units of information using electronic technologies.

Electronic technologies, such as computer technologies, relating to reducing the size and increasing the complexity of electronics have permitted computers to be packaged into smaller and more powerful electronic devices. An electronic device may be used to receive and process information. The electronic device may provide compact storage of the information as well as ease of access to the information. For example, a single electronic device may store a large quantity of information that might be downloaded instantaneously at any time via the Internet. In addition, the electronic device may be backed up, so that physical damage to the device does not necessarily correspond to a loss of the information stored on the device.

In addition, a user may interact with the electronic device. For example, the user may read information that is displayed by the electronic device. Further, the user may instruct the device to display a specific piece of information stored on the electronic device. As such, benefits may be realized from improved systems and methods for interacting with an electronic device.

DETAILED DESCRIPTION

Figure 1:
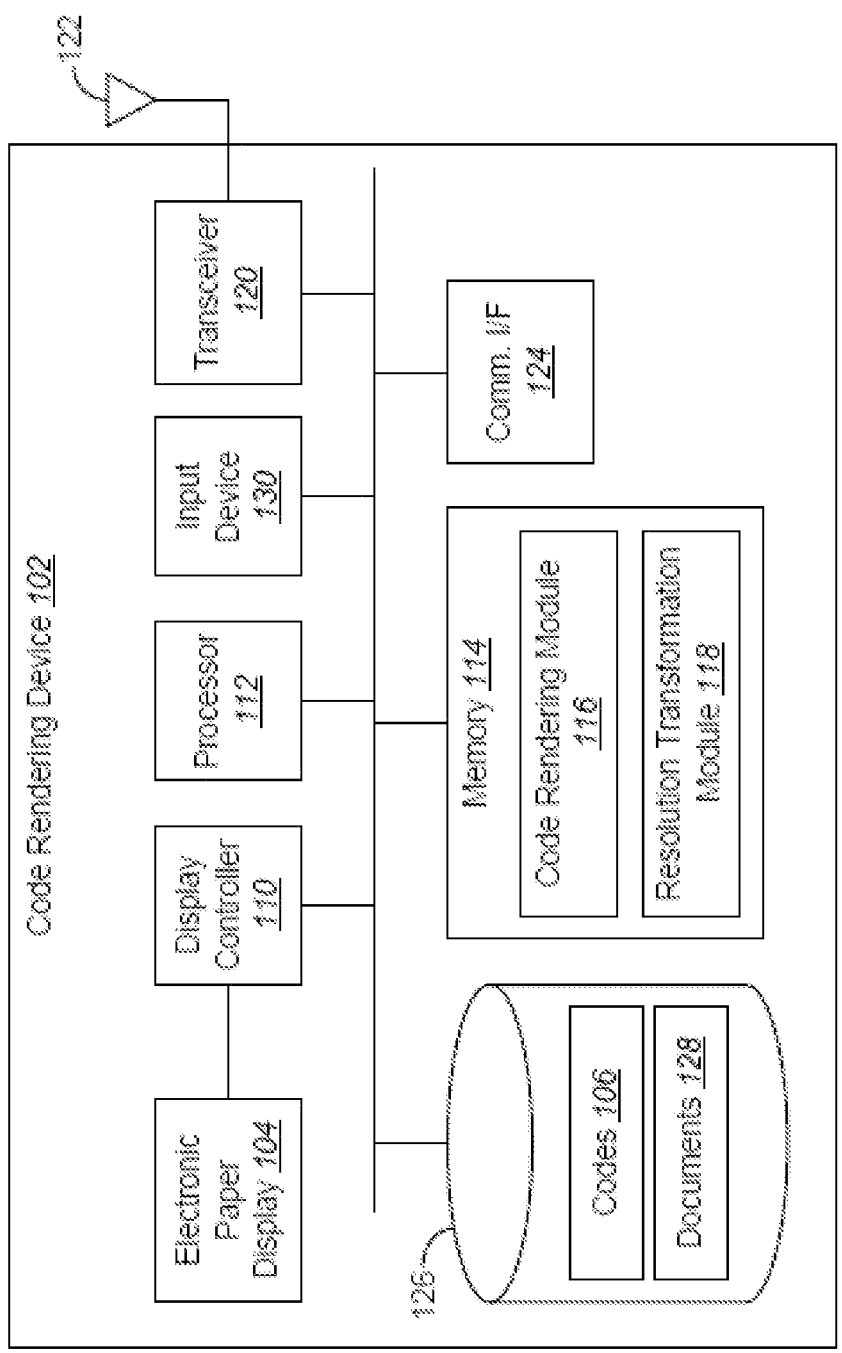
FIG. 1 illustrates a machine-readable code rendering device.

A machine-readable code rendering device is disclosed. The machine-readable code rendering device may include an electronic paper display, and a machine-readable code rendering module that dynamically renders machine-readable codes on the electronic paper display. The electronic paper display may be configured so that the machine-readable codes are read by a light-based code reader off of the electronic paper display.

The machine-readable code rendering device may also include a resolution transformation module that adjusts the resolution of the machine-readable codes so that they have the appropriate dimensions when they are rendered on the electronic paper display.

The machine-readable code rendering device may also include a wireless transceiver that sends and receives wireless communications. The machine-readable code rendering device may also include at least one communication interface instead of or in addition to the wireless transceiver.

The machine-readable code rendering device may also include nonvolatile storage that stores machine-readable codes and other documents. The machine-readable code rendering device may also include at least one user input device.

The machine-readable code rendering device may include a product search module that searches for a machine-readable code corresponding to a product. This may be useful in the context of inventory management.

The machine-readable code rendering device may also include a location determining module that determines the current location of the code rendering device. This may be useful in a situation where the machine-readable code rendering device is being used in connection with a location-based service.

The machine-readable code rendering device may also include a code generation module. The code generation module may permit the machine-readable code rendering device to serve as a bridge between machine-readable codes and other machine-readable tags.

A method for receiving information that is relevant to a current location is also disclosed. The method may be implemented by a machine-readable code rendering device.

In accordance with the method, a machine-readable code on the machine-readable code rendering device may be accessed. The machine-readable code may include a device identifier. The device identifier may be uniquely associated with the machine-readable code rendering device. The machine-readable code rendering device may include an electronic paper display. The machine-readable code may be displayed on the electronic paper display so that the machine-readable code is read by a light-based code reader at the current location. In response, the machine-readable code rendering device may receive information that is related to the current location.

This method may be implemented in a variety of different situations. For example, the method for receiving information that is relevant to a current location may be implemented in a situation where the current location is a store. In this situation, the information may include general store information and/or user-specific shopping information.

As another example, the method for receiving information that is relevant to a current location may be implemented in a situation where the current location is a school classroom. In this situation, the information may include educational materials.

A method for simplifying checkout at a store is also disclosed. The method may be implemented by a machine-readable code rendering device.

In accordance with the method, a machine-readable code on the machine-readable code rendering device may be accessed. The machine-readable code rendering device may include an electronic paper display. The machine-readable code may be displayed on the electronic paper display of the machine-readable code rendering device in connection with at least one shopping transaction. The machine-readable code may be read by a light-based code reader that is connected to a point-of-sale computing device.

The shopping transaction may be, for example, presenting a membership card at checkout. As another example, the shopping transaction may be presenting coupons during checkout. As yet another example, the shopping transaction may be picking up an item from a store, where the item has been purchased online.

The machine-readable code rendering device may also be used to verify the identity of the user of the machine-readable code rendering device. This may include displaying a verification code on the electronic paper display, and receiving a confirming document in response to the verification code being read by the light-based code reader.

One or more electronic receipts may be saved on the machine-readable code rendering device. The electronic receipts may correspond to a purchase that has been made.

A machine-readable code rendering device is also disclosed. The machine-readable code rendering device may include display means, and means for dynamically rendering machine-readable codes on the display means. The display means may be configured so that the machine-readable codes are read by a light-based code reader off of the display means.

The machine-readable code rendering device may also include means for adjusting the resolution of the machine-readable codes so that they have the appropriate dimensions when they are rendered on the display means. The machine-readable code rendering device may also include means for sending and receiving wireless communications. The machine-readable code rendering device may also include means for storing the machine-readable codes and other documents. The machine-readable code rendering device may also include means for receiving user input.

The machine-readable code rendering device may also include means for searching for a machine-readable code corresponding to a product. The machine-readable code rendering device may also include means for determining the current location of the code rendering device. The machine-readable code rendering device may also include means for serving as a bridge between machine-readable codes and other machine-readable tags.

FIG. 1 illustrates an example of a machine-readable code rendering device 102. The code rendering device 102 includes an electronic paper display 104. The electronic paper display 104 may be any electronic display that is configured to display a machine-readable code 106 so that it may be read by a light-based code reader 108. As used herein, the term "light-based code reader" 108 may refer to any electronic device that reads machine-readable codes 106 by detecting reflected light and converting optical impulses into electrical signals.

There are many different kinds of machine-readable codes 106 that may be used in accordance with the present disclosure. The machine-readable codes 106 may be linear (one-dimensional) codes or two-dimensional codes. Examples of linear code symbologies include the Universal Product Code (UPC), Code 39, Code 93, GS1-128, etc. Examples of two-dimensional code symbologies include PDF417, Aztec Code, MaxiCode, Datamatrix, etc.

Machine-readable codes 106 that are based on a linear code symbology may be referred to as bar codes. Machine-readable codes 106 that are based on a two-dimensional code symbology may be referred to as two-dimensional bar codes, matrix codes, etc.

There are many different kinds of light-based code readers 108 that may be used in accordance with the present disclosure. For example, the light-based code reader 108 may be a laser scanner, a pen type reader, a charge-coupled display (CCD) reader (also referred to as a light-emitting diode (LED) scanner), a camera-based reader, etc. The type of light-based code reader 108 that is being used may depend on the type of code 106 that is being read.

The electronic paper display 104 may reflect light in a similar manner to ordinary paper. The electronic paper display 104 may be capable of holding text and images indefinitely without drawing electricity, while allowing the text and images to be changed later. There are several different technologies that may be used to create the electronic paper display 104. For example, the electronic paper display 104 may be an electrophoretic display, a bistable liquid crystal display (LCD), a cholesteric LCD display, etc.

The code rendering device 102 also includes a processor 112, which controls the operation of the code rendering device 102. The code rendering device 102 also includes memory 114 in electronic communication with the processor 112. Several different modules may be stored within the memory 114. These modules may include program instructions that are executed by the processor 112 to perform various functions.

For example, a code rendering module 116 may be configured to dynamically render machine-readable codes 106 on the electronic paper display 104. In this context, the term "dynamically" means that the codes 106 that may be rendered on the electronic paper display 104 change over time. Thus, the electronic paper display 104 may be used in the same way as a computer display in that the codes 106 that are rendered on the electronic paper display 104 may be easily changed. In addition, the electronic paper display 104 may reflect light in a similar manner to ordinary paper, so that the codes 106 may be read by a light-based code reader 108.

A resolution transformation module 118 may be configured to adjust the resolution of the machine-readable codes 106, as appropriate, so that they have the appropriate dimensions when they are rendered on the electronic paper display 104 (e.g., so that the codes 106 do not appear skewed). For example, if a certain machine-readable code 106 is supposed to be N pixels wide so that it is read properly by a code reader 108, the resolution transformation module 118 may ensure that the machine-readable code 106 is N pixels wide when it is displayed on the electronic paper display 104.

The code rendering device 102 may include a wireless transceiver 120 and an antenna 122 for sending and receiving wireless communications. There are many different protocols through which wireless communications may be sent and received. Some examples of wireless communication protocols include WiFi, WiMAX, etc. The code rendering device 102 may be configured so that it permits a user to connect to the Internet. The code rendering device 102 may also include one or more other communication interfaces 124, such as one or more Universal Serial Bus (USB) ports. The code rendering device 102 may also include a display controller 110 that controls the display of codes 106 (as well as other images and text) on the electronic paper display 104.

The code rendering device 102 may also include non-volatile storage 126. Machine-readable codes 106 and other documents 128 may be stored in the non-volatile storage 126 of the code rendering device 102. The non-volatile storage 126 may include magnetic storage, optical storage, flash memory, etc.

The code rendering device 102 may also include one or more input devices 130 that permit user input to the code rendering device 102. Some examples of input devices 130 include a keyboard, a touchpad, one or more input buttons, a scroll wheel, a microphone, etc.

Figure 2:
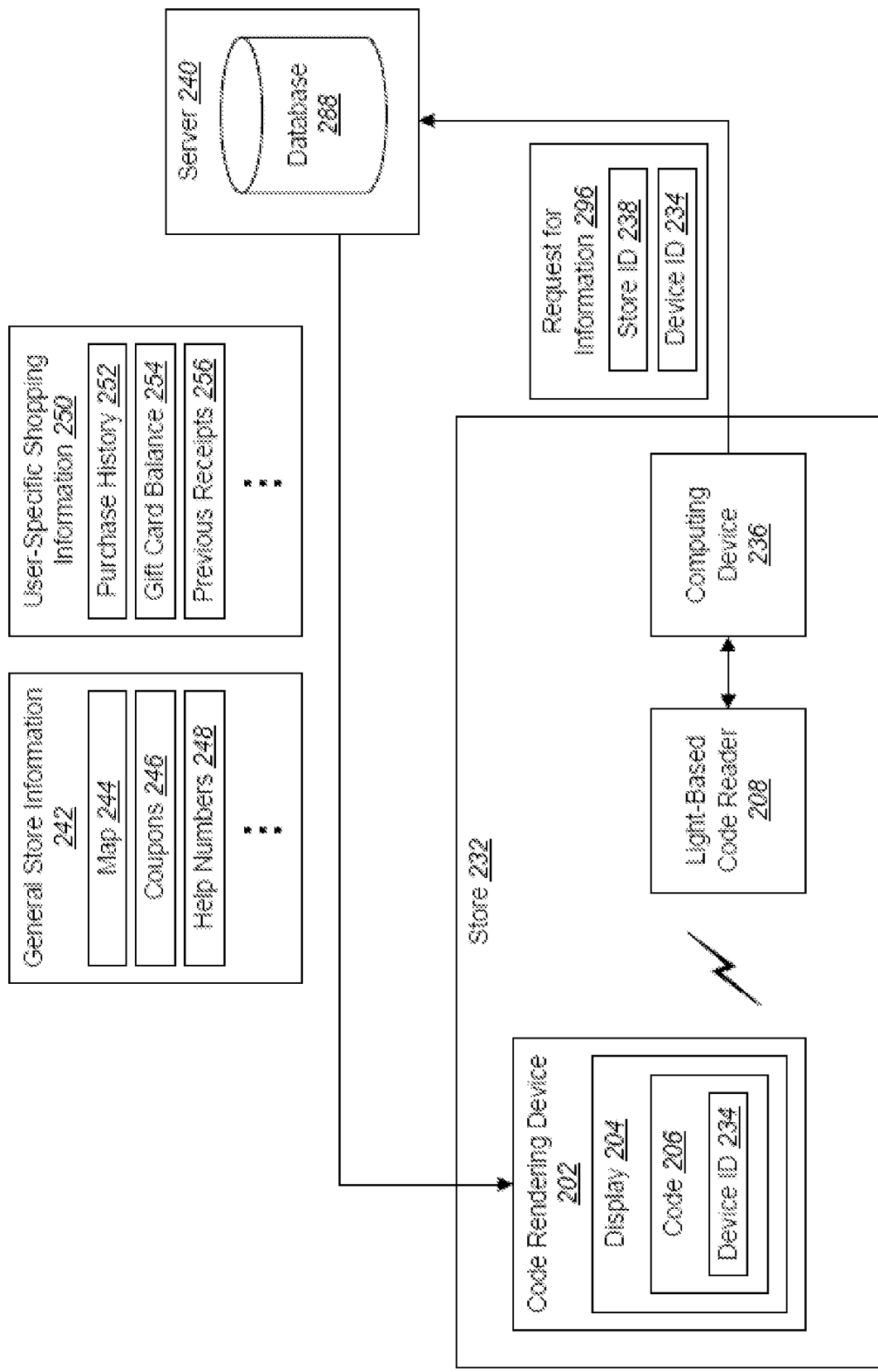
FIG. 2 illustrates an example showing how a code rendering device may be used to provide information to a person who is shopping at a store.

FIG. 2 illustrates an example showing how a code rendering device 202 may be used to provide information to a person who is shopping at a store 232. The code rendering device 202 may include the various components that are shown in connection with the code rendering device 102 of FIG. 1, including an electronic paper display 204.

A device identifier (ID) 234 may be associated with the code rendering device 202. The device ID 234 may uniquely identify the code rendering device 202. A machine-readable code 206 that includes the device ID 234 may be saved on the code rendering device 202 (e.g., in the non-volatile storage 126 of the code rendering device 202).

When the user of the code rendering device 202 enters the store 232, the user may walk to a location within the store 232 where there is a light-based code reader 208. The light-based code reader 208 may, for example, be positioned at a dedicated booth at a visibly prominent location within the store 232.

Upon arriving at the place within the store 232 where the light-based code reader 208 is located, the user may cause the code 206 containing the device ID 234 to be displayed on the electronic paper display 204. This may involve providing user input via one or more user input device(s) 130. The user may then position the code rendering device 202 so that the machine-readable code 206 containing the device ID 234 is read by the light-based code reader 208.

In response to the machine-readable code 206 being read, certain things may occur that ultimately result in the user receiving information that is related to the store 232 and that may enhance the user's experience while shopping at the store. In particular, the light-based code reader 208 may decode the device ID 234, and send the decoded device ID 234 to a computing device 236 to which it is connected. In response, the computing device 236 may send a request 296 for information to a server 240. The request 296 for information may include the device ID 234 and a store ID 238 that uniquely identifies the store 232.

The server 240 may include a database 288 of information about the store 232 (and possibly about other stores as well). In response to receiving the request 296 for information, the server 240 may identify information in the database 288 that is associated with the store ID 238. This information may include general store information 242, such as a map 244 of the store 232, coupons 246, help numbers 248, etc. The server 240 may also identify information in the database 288 that is associated with the device ID 234. This may include user-specific shopping information 250, such as the user's purchase history 252, the balance 254 of any gift cards that the user has on file with the store 232, receipts 256 from previous purchases made at the retail store 232, etc.

The server 240 may then send the store information 242 and/or the user-specific shopping information 250 to the code rendering device 202. The server 240 may determine how to send this information 242, 250 to the code rendering device 202 via the device ID 234. For example, the database 288 may include a communication address for the code rendering device 202 that is associated with the device ID 234.

The general store information 242 and/or the user-specific shopping information 250 may be received immediately (or very shortly after) the code 206 is read by the code reader 208 at the store 232. The user of the code rendering device 202 may use the general store information 242 and the user-specific shopping information 250 to enhance his/her shopping experience at the store 232. For example, the user may view the map 244 on the electronic paper display 204, and use the map 244 to locate specific products within the store 232. The server 240 may have information about the user's buying patterns, and the products that the user normally buys may be highlighted within the map 244.

The map 244 may have "hot spots," so that if the user has questions while shopping, he/she may activate one of the hot spots and an employee at the store 232 will be sent to a location corresponding to the activated hot spot to answer questions. Alternatively, the user may place a call to one of the help numbers 248 that he/she has received to ask questions.

Also, the user may redeem the coupons 246 that he/she has received to save money on products that he/she purchases at the store 232. Advantageously, when the user checks out from the store 232 (i.e., goes to a cash register to pay for the products that he/she is buying), the user may cause the coupons 246 to be displayed on the electronic paper display 204 of the code rendering device 202, and the machine-readable code on each coupon 246 may be read off of the display 204. In this way, the user does not have to keep track of paper coupons.

The user may access his/her purchase history 252 for a variety of reasons, such as to avoid duplicate purchases. The user may refer to the gift card balance 254 when determining how to pay for the items that he/she wants to purchase. Previous receipts 256 may be used when the user is returning or exchanging items that were purchased previously. Thus, the user does not have to keep track of paper receipts, which can be easily misplaced.

Communication between the server 240 and the code rendering device 202 may occur via one or more computer networks (e.g., the Internet). The code rendering device 202 may receive the general store information 242 and the user-specific shopping information 250 via a wireless transceiver 120.

The server 240 may be under the control of the store 232 or an organization that is affiliated with the store 232. Alternatively, the server 240 may be under the control of a third-party organization, and the store 232 may contract with this organization to send information 242, 250 to code rendering devices 202 in the manner described.

The general store information 242 and the user-specific shopping information 250 shown in FIG. 2 are just examples of the types of information that may be sent to the code rendering device 202 in accordance with the present disclosure. These examples are provided for illustration purposes only, and they should not be interpreted as limiting the scope of the present disclosure. Other types of general store information 242 may be sent to the code rendering device 202, such as the store manager's name, the address of the store 232, product catalogs, etc. Similarly, other types of user-specific shopping information 250 may be sent to the code rendering device 202, such as user-specific product recommendations, information about current sales, contests, and/or promotions that are occurring at the store 232 and that may be of interest to the user, etc.

In specific terms, FIG. 2 illustrates how a code rendering device 202 may be used to provide information to a person who is shopping at a store 232. More generally, however, FIG. 2 illustrates an example of a method for receiving information that is relevant to a person's current location. In this example, the current location is the store 232, and the information that is received is the general store information 242 and/or the user-specific shopping information 250. The method that is illustrated in FIG. 2 may be applied in other contexts where the current location is something other than a store 232. For example, a similar method may be applied in an educational context, as will be described in greater detail below.

Another aspect of the present disclosure relates to providing a "store home page" on the code rendering device 202, where the store home page includes various featured products. If the code rendering device 202 is able to detect that it is in a particular store 232, then the code rendering device 202 may present the user with a store home page that features various products that the store 232 would like to promote. The store 232 may partner with an online merchant, so that products that are not available at the store 232 may be featured on the store home page. In this situation, the store 232 and the online merchant may share the proceeds from any sales that are made via the store home page.

There are many ways that a code rendering device 202 may detect that it is in a particular store 232. For example, after the code 206 containing the device ID 234 has been read and the device ID 234 has been sent to the server 240 along with the store ID 238, then the server 240 knows where the code rendering device 202 is located. The code rendering device 202 may periodically communicate with the server 240 (e.g., via the wireless transceiver 120) to determine its location. Alternatively, the code rendering device 202 may detect its location via a global positioning system (GPS) receiver, WiFi triangulation, etc.

The example of FIG. 2 illustrates one possible way that a code rendering device 202 may be used in a shopping context. However, there are many other ways that a code rendering device 202 may be used in a shopping context, and the example of FIG. 2 should not be interpreted as limiting the scope of the present disclosure. Some other examples of ways that a code rendering device 202 may be used in a shopping context will be described below.

Figure 2A:
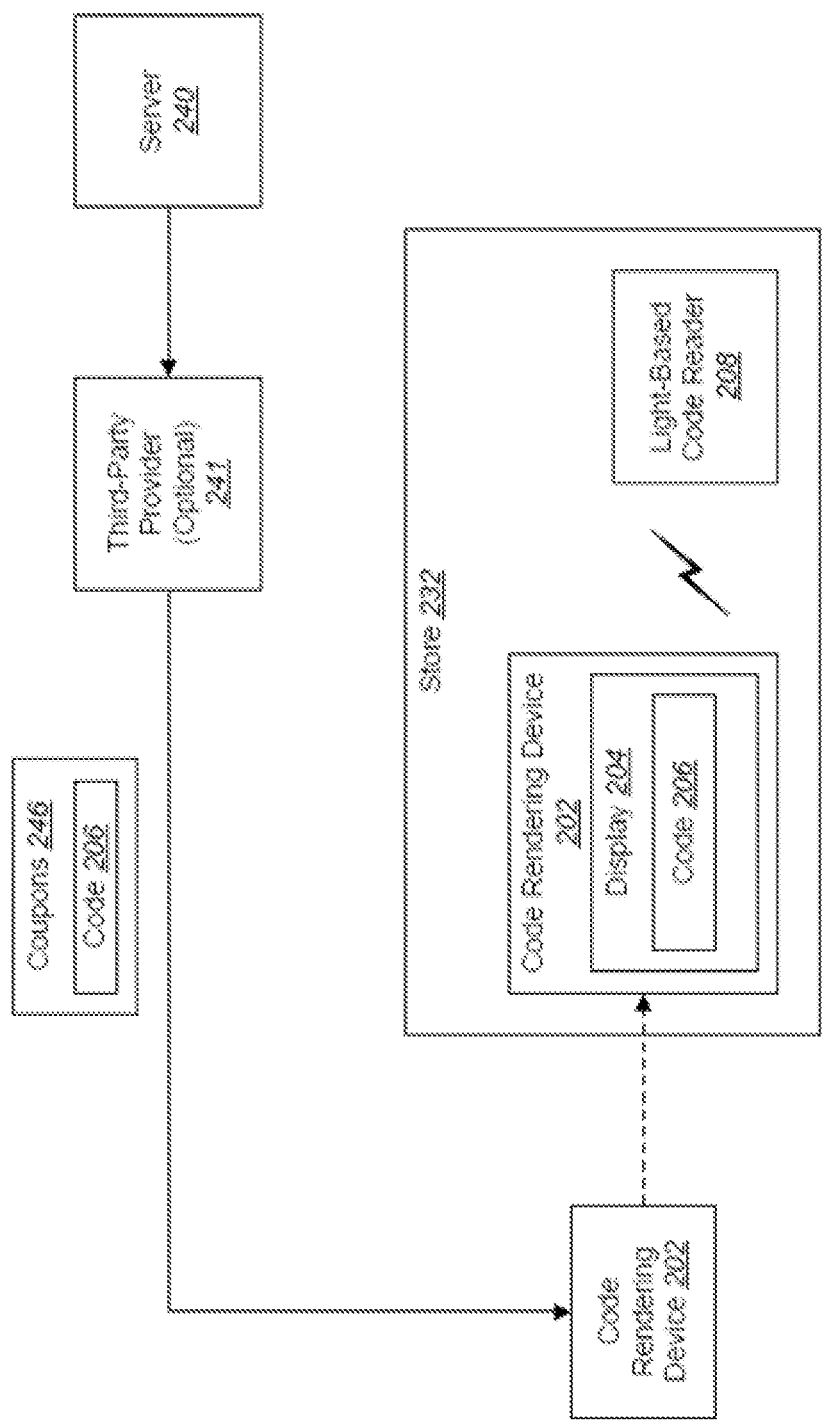
FIG. 2A illustrates another example showing how a code rendering device may be used in a shopping context.

FIG. 2A illustrates another example showing how a code rendering device 202 may be used in a shopping context. In the example of FIG. 2A, the server 240 may send coupons 246 that may be used at the store 232 to the code rendering device 202. The coupons 246 may include machine-readable codes 206. Then, the code rendering device 202 may be taken to the store 232, and the coupons 246 may be used while shopping at the store 232.

The server 240 may send the coupons 246 directly to the code rendering device 202. Alternatively, the coupons 246 may be sent to the code rendering device 202 via a third-party provider 241. For example, the third-party provider 241 may be a publisher. The store server 240 may send coupons 246 to the publisher, and the publisher may include the coupons 246 in an electronic periodical (e.g., an electronic newspaper). Thus, the user of the code rendering device 202 may receive the coupons 246 when he/she receives the electronic periodical.

At some point in time after the coupons 246 are received, the user may take his/her code rendering device 202 to the store 232 and use the coupons 246. In particular, a light-based code reader 208 at the store 232 may be used to read the coupons 246 off of the electronic paper display 204 of the code rendering device 202.

Although coupons 246 are shown in the example of FIG. 2A, machine-readable codes 206 may be included in other types of electronic content that are sent to the code rendering device 202. For example, machine-readable codes 206 (and other information as well) may be included in articles within electronic periodicals that are sent to the code rendering device 202.

Figure 2B:
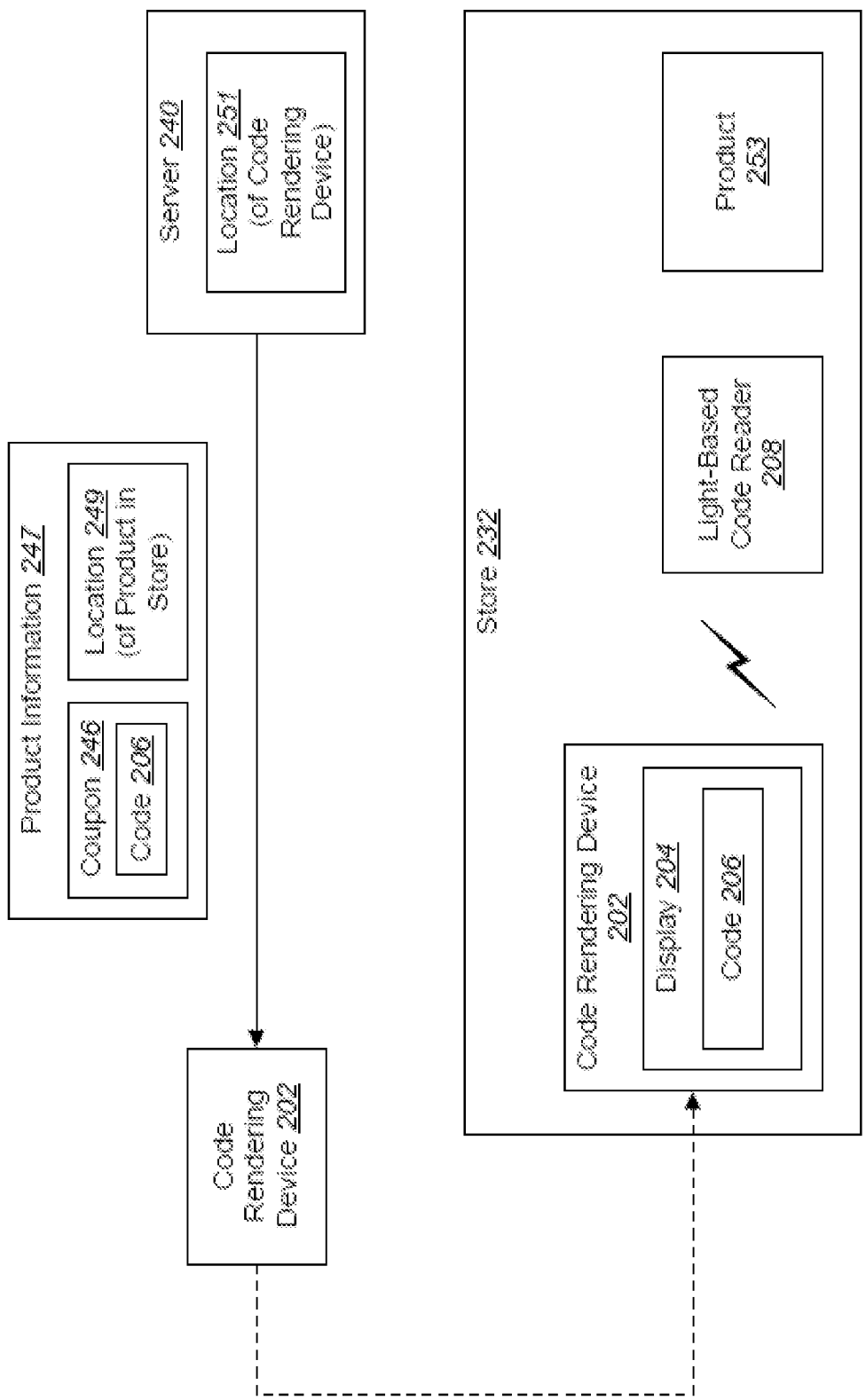
FIG. 2B illustrates another example showing how a code rendering device may be used in a shopping context.

FIG. 2B illustrates another example showing how a code rendering device 202 may be used in a shopping context. This example relates to the sale of a specific product 253 at the store 232.

There may be many different stores that carry the product 253. The server 240 may determine the store 232 that is located closest to the user of the code rendering device 202. For example, the code rendering device 202 may include a location determining component (e.g., a GPS receiver), and the code rendering device 202 may report its location to the server 240. Alternatively, there may be a specific device ID associated with the code rendering device 202, and this device ID may be associated with a particular location (which may be determined during a registration process, for example).

When the store 232 that is located closest to the user of the code rendering device 202 is determined, the server 240 may then send product information 247 to the code rendering device 202. The product information 247 may describe the product 253, and may indicate the store 232 that is closest to the user where the product 253 may be purchased. In addition, the product information 247 may include the specific location 249 of the product 253 within the store 232 (e.g., the product 253 is located on aisle X). In addition, the product information 247 may include a machine-readable code 206 that is related to the product 253. For example, the machine-readable code 206 may be included in a coupon 246 for the product 253.

At some subsequent point in time, the user may take his/her code rendering device 202 to the store 232 and locate the product 253 using the information 247 that has been received. The user may also use the coupon 246 when purchasing the product 253. If the coupon 246 is used, a light-based code reader 208 at the store 232 may be used to read the coupon 246 off of the electronic paper display 204 of the code rendering device 202.

Figure 3:
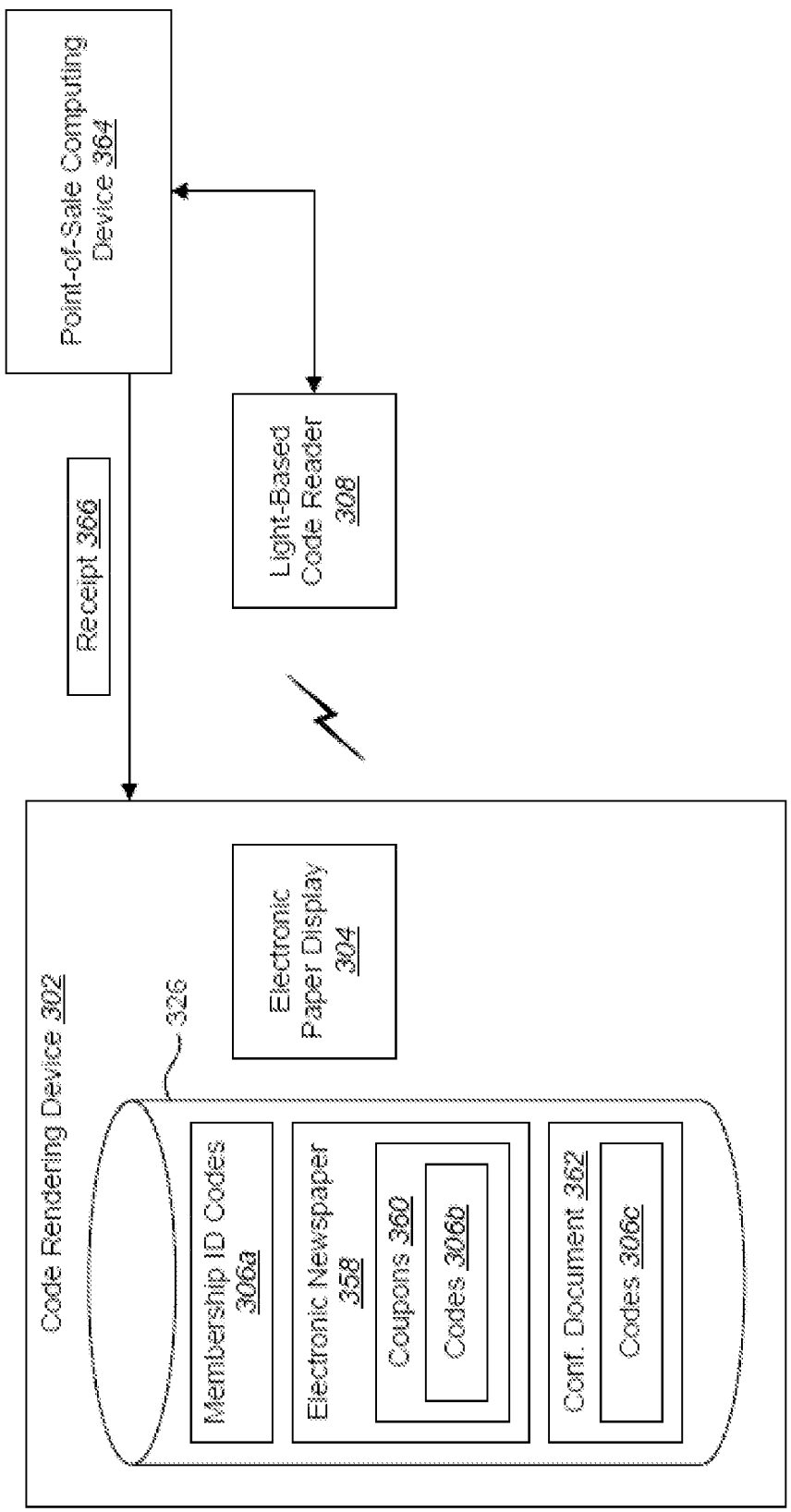
FIG. 3 illustrates several examples showing how a code rendering device may be used to simplify shopping transactions at a store.

FIG. 3 illustrates several examples showing how a code rendering device 302 may be used to simplify shopping transactions at a store 232. The code rendering device 302 may include the various components that are shown in connection with the code rendering device 102 of FIG. 1, including an electronic paper display 304 and non-volatile storage 326. The code rendering device 302 is shown in close proximity to a light-based code reader 308 that is connected to a point-of-sale computing device 364.

Several shopping transactions will be described in relation to FIG. 3. The first shopping transaction that will be described is presenting a membership card at checkout. Some stores 232 require customers to present a membership card when they check out, or they give significant discounts to customers who do present such membership cards at checkout. These membership cards typically include a machine-readable code 306a that includes a membership identifier (ID). It can be quite inconvenient for a person to keep track of all of the membership ID cards corresponding to all of the stores where he/she shops.

Advantageously, with a code rendering device 302 as described herein, the membership ID codes 306a from those membership cards may be stored in electronic form on the code rendering device 302. This eliminates the need to carry around one or more membership cards in a person's wallet when going shopping. When it is time to check out, the user may cause the appropriate membership ID code 306a to be displayed on the electronic paper display 304, and the light-based code reader 308 connected to the point-of-sale computing device 364 may read the membership ID code 306a off of the display 304.

The next shopping transaction that will be described is presenting coupons during checkout. Many shoppers like to use coupons while shopping in order to save money. Such shoppers may look for coupons in newspapers, which may include entire sections that are devoted to coupons. Coupons typically include a machine-readable code that is read by a light-based code reader 308 when the coupon is redeemed.

The code rendering device 302 may have other uses in addition to rendering machine-readable codes 306. In fact, rendering machine-readable codes 306 may not be the primary function of the code rendering device 302. For example, the code rendering device 302 may primarily be used as an electronic book reader. The user of the code rendering device 302 may subscribe to an electronic newspaper 358, which the user may read on the electronic paper display 304.

Advantageously, coupons 360 may be included within the electronic newspaper 358. Thus, instead of clipping coupons from a printed newspaper, the user may simply save any desired coupons 360 on the code rendering device 302 in electronic form. Each coupon may include a machine-readable code 306b. When the user wants to redeem a coupon 360 when shopping at a store 232, the user may cause the coupon 360, and the machine-readable code 306b contained therein, to be displayed on the electronic paper display 304 (e.g., via one or more input device(s) 130). The light-based code reader 308 connected to the point-of-sale computing device 364 may then read the coupon code 306b off of the electronic paper display 304.

The next shopping transaction that will be described is picking up an item that has been purchased online. Many stores permit customers to purchase items online and then pick up the purchased items in the store. After the customer makes the online purchase, a confirmation document 362 that includes a machine-readable code 306c may be provided to the customer (e.g., a confirmation email may be sent, a document such as a Portable Document Format (PDF) file may be downloaded, etc.).

Typically, the customer prints the confirmation document 362 and takes it with him/her to the store to pick up the purchased item. However, with a code rendering device 302 as described herein, the customer may simply save the confirmation document 362 on the code rendering device 302. When the customer goes to the store 232 to pick up the purchased item, the customer may cause the confirmation document 362, including the machine-readable code 306c contained therein, to be displayed on the electronic paper display 304 (e.g., via one or more input device(s) 130). The light-based code reader 308 connected to the point-of-sale computing device 364 may then read the code 306c contained within the confirmation document 362 off of the electronic paper display 304.

The confirmation document 362 may be sent directly to the code rendering device 302. Alternatively, the confirmation document 362 may be sent to another computing device and then transferred to the code rendering device 302.

The code rendering device 302 may also be used to store receipts corresponding to purchases that have been made. A customer typically receives a receipt whenever he/she purchases one or more items from a store 232. Receipts may be used for a variety of purposes, such as for returns and/or exchanges, for tax purposes, etc. However, the average customer may receive a very large number of receipts, and it can be quite difficult to keep track of all of the receipts that are received.

Advantageously, with a code rendering device 302 as described herein, receipts 366 (in electronic form) may be sent directly to and saved on the code rendering device 302. This eliminates the need for the customer to keep track of paper receipts, which can be easily misplaced. The point-of-sale computing device 364 (or a server that is connected to the point-of-sale computing device 364) may send an electronic receipt 366 to the code rendering device 302 immediately after the corresponding purchase has been completed. Alternatively, the electronic receipt 366 may be sent at a later time. If the customer ever needs the receipt 366 (e.g., if the customer decides to return/exchange the purchased item), the customer may easily locate the receipt 366 on the code rendering device 302 and display it on the electronic paper display 304.

Alternatively, the receipt 366 may be sent to another computing device, and then subsequently be transferred to the code rendering device 302. Alternatively still, the user of the code rendering device 302 may receive a paper copy of the receipt 366 (either directly or via regular mail), which may then be scanned and saved on the code rendering device 302. Alternatively still, the receipt 366 may be stored on a server 240 for subsequent recall. Combinations of the foregoing possibilities may also be utilized (e.g., both electronic and paper copies of the receipt 366 may be provided to the user of the code rendering device 302).

Figure 4:
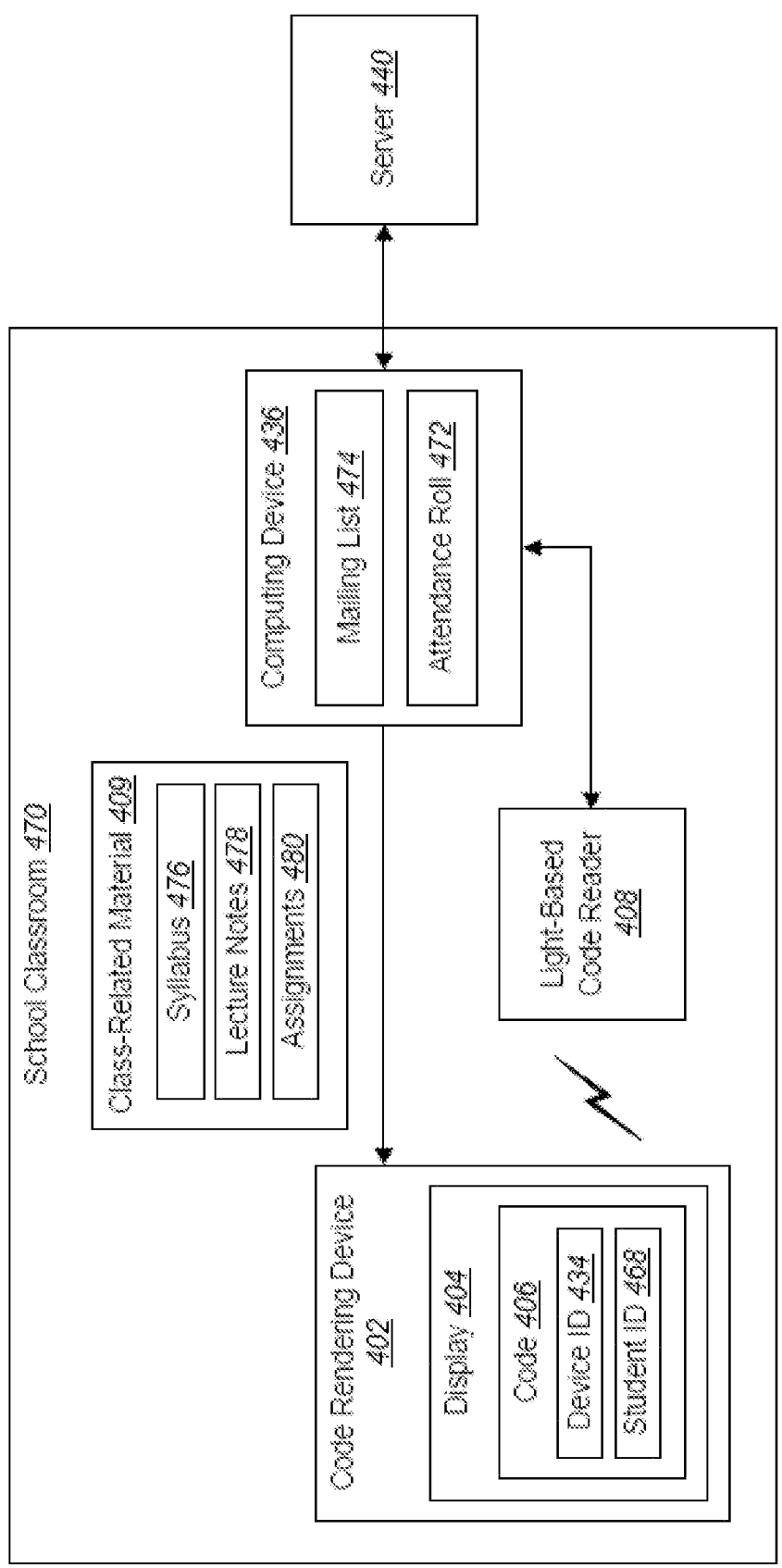
FIG. 4 illustrates an example showing some of the benefits that may be realized by using a code rendering device in an educational setting.

FIG. 4 illustrates an example showing some of the benefits that may be realized by using a code rendering device 402 in an educational setting. The code rendering device 402 may include the various components that are shown in connection with the code rendering device 102 of FIG. 1, including an electronic paper display 404.

In this example, it is assumed that the code rendering device 402 is being used by a student. A machine-readable code 406 that includes a device ID 434 and a student ID 468 may be saved on the code rendering device 402 (e.g., in non-volatile storage 126).

A school classroom 470 may include a light-based code reader 408 that is connected to a computing device 436. The computing device 436 may be used by a teacher of the class. Upon entering the classroom 470, each student who has a code rendering device 402 may use the light-based code reader 408 to read the code 406 that includes his/her device ID 434 and student ID 468. The device ID 434 and the student ID 468 may be sent to the computing device 436.

The student ID 468 may be automatically added to an attendance roll 472. Thus, in a classroom setting where taking attendance is important, attendance may be taken automatically using the code rendering device 402 in the manner just described.

The device ID 434 may be used to automatically add the student to a mailing list 474 for the class. The device ID 434 may itself include a communication address for the code rendering device 402. Alternatively, the device ID 434 may be used to determine a communication address for the code rendering device 402 (e.g., by communicating with a server 440).

Certain information may be sent to the student's code rendering device 402 immediately after the code 406 is read. For example, a syllabus 476, notes 478 for that day's lecture, and assignments 480 to be completed may be sent to the student's code rendering device 402.

Other information may be sent to the code rendering device 402 at a later time. For example, as soon as the teacher has finished grading the assignments 480, the graded assignments 480 may be sent to the student's code rendering device 402. Thus, the student does not have to wait until the next class period before receiving feedback on the assignments 480.

The syllabus 476, lecture notes 478, and assignments 480 are just examples of the types of information that may be sent to the code rendering device 402 in accordance with the present disclosure. These examples are provided for illustration purposes only, and they should not be interpreted as limiting the scope of the present disclosure. In general, any type of class-related material 409 may be sent to the code rendering device 402.

In specific terms, FIG. 4 illustrates how a code rendering device 402 may be used in an educational setting. More generally, however, FIG. 4 illustrates another example of a method for receiving information that is relevant to a person's current location. In this example, the current location is the school classroom 470, and the information that is received is the class-related material 409 (e.g., the syllabus 476, the lecture notes 478, the assignments 480, etc.).

Figure 5:
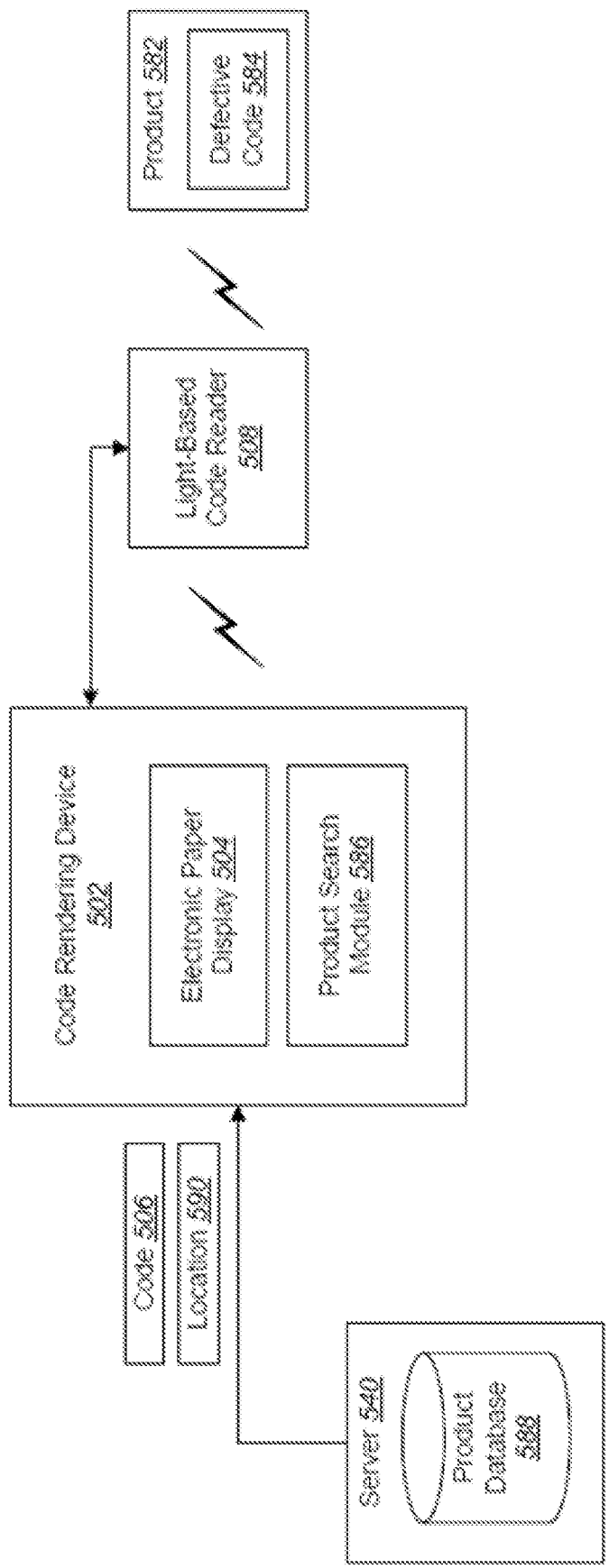
FIG. 5 illustrates an example showing how a code rendering device may be used for purposes of inventory management.

FIG. 5 illustrates an example showing how a code rendering device 502 may be used for purposes of inventory management. The code rendering device 502 may include the various components that are shown in connection with the code rendering device 102 of FIG. 1, including an electronic paper display 504.

For purposes of this example, it will be assumed that a light-based code reader 508 is being used to read machine-readable codes that are physically attached to products 582 for purposes of inventory management. It will also be assumed that the light-based code reader 508 is connected to the code rendering device 502.

At some point, the user may come across a product 582 that has a defective machine-readable code 584, i.e., the code 584 that is physically attached to the product 582 cannot be read by the light-based code reader 508. When this occurs, the code rendering device 502 may be used to search for a machine-readable code 506, in electronic form, corresponding to the product 582. A product search module 586 is shown on the code rendering device 502 for providing this search functionality. The product search module 586 may search for the code 506 by querying a product database 588 that is stored on a server 540.

If the code 506 is stored within the product database 588 in electronic form, it may be sent to the code rendering device 502 and displayed on the electronic paper display 504. The light-based code reader 508 may then be used to read the code 506 off of the electronic paper display 504. Thus, even though the product 582 itself has a defective code 584 physically attached to it, the user of the code rendering device 502 may be able to read the product's code 506 off of the electronic paper display 504. The code rendering device 502 may also be used to obtain additional information about the product 582, such as its location 590 within a warehouse.

The product search module 586 may be stored within the memory 114 of the code rendering device 502 and executed by the processor 112. Alternatively, the product search module 586 may be implemented at least partially in firmware and/or hardware.

Figure 6:
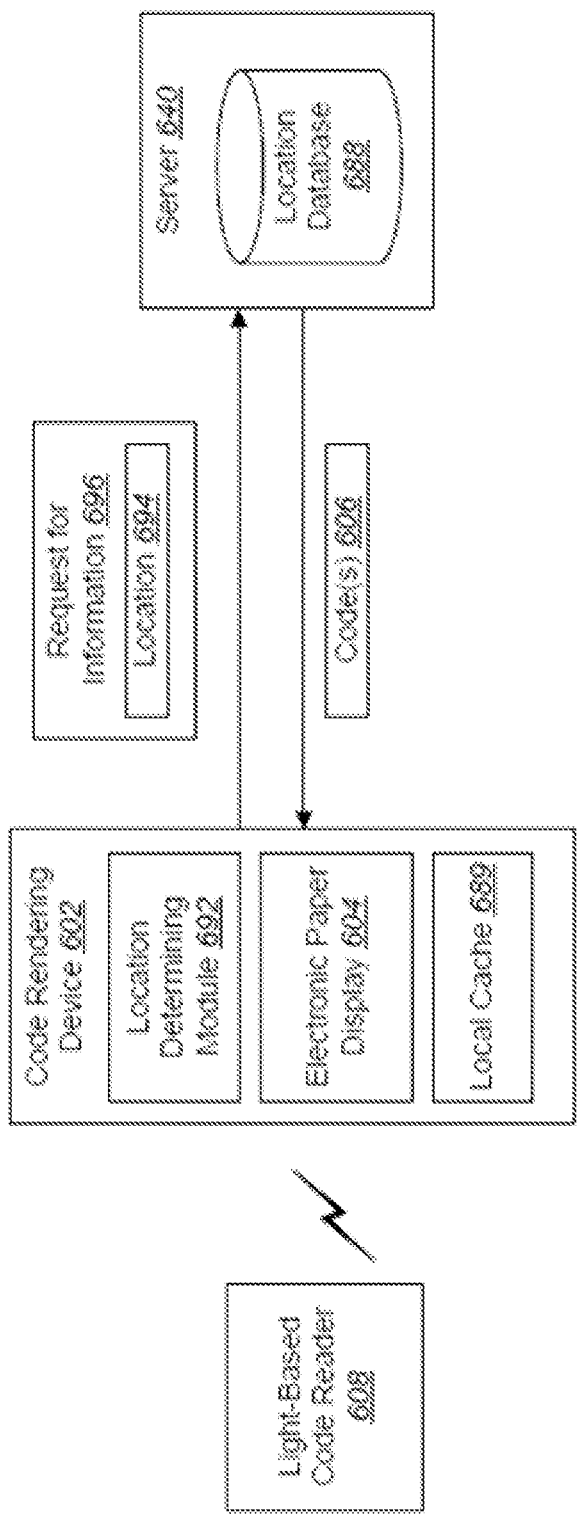
FIG. 6 illustrates an example showing how machine-readable codes that are sent to a code rendering device may depend on the location of the code rendering device.

Referring now to FIG. 6, one aspect of the present disclosure relates to the way in which machine-readable codes 606 are sent to a code rendering device 602. FIG. 6 illustrates an example showing how machine-readable codes 606 that are sent to a code rendering device 602 may depend on the location of the code rendering device 602. The code rendering device 602 may include the various components that are shown in connection with the code rendering device 102 of FIG. 1, including an electronic paper display 604.

In addition, the code rendering device 602 may include a location determining module 692 that is configured to determine the current location 694 of the code rendering device 602. The location determining module 692 may be implemented as a global positioning system (GPS) receiver, a WiFi triangulation component, etc.

A specific example will now be described. However, this example is provided for purposes of illustration only, and it should not be interpreted as limiting the scope of the present disclosure.

Suppose that a user of the code rendering device 602 is at a car dealership shopping for cars. When the user finds a car about which he/she would like to find out more information, the user may stand in close proximity to the car and send a request 696 for information to a server 640. The wireless transceiver 120 of the code rendering device 602 may be utilized to send the request 696 for information. The request 696 for information may include the location 694 of the code rendering device 602, as determined by the location determining module 692.

Upon receiving the request 696 for information from the code rendering device 602, the server 640 may identify the car where the code rendering device 602 is currently located. This may be done by referring to a database 688 that includes the locations of the various cars at the dealership. Then, the code distribution server 640 may send a machine-readable code 606 corresponding to the car to the code rendering device 602.

The code rendering device 602 may then be taken to a salesperson at the car dealership. The salesperson may use a light-based code reader 608 to read the code 606 off of the electronic paper display 604 of the code rendering device 602. By doing this, the salesperson is able to determine exactly what car the potential customer would like to found out more information about.

Of course, there are many other situations in which it might be useful for the code rendering device 602 to be able to receive machine-readable codes 606 based on its location. Another example is when a person is shopping for a home or another type of real estate. When a potential buyer finds a real estate property for which he/she would like to find out more information, the code rendering device 602 may be used to send a request for information 696 to a server 640. The server 640 may identify the real estate property where the code rendering device 602 is currently located. The code rendering device 602 may be taken to a real estate office at a later time. A real estate agent may then determine exactly what real estate property the potential buyer is interested in by using a light-based code reader 608 to read the code 606 off of the electronic paper display 604 of the code rendering device 602.

In FIG. 6, the location database 688 is shown being located on the server 640. Alternatively, the location database 688 (or at least a portion thereof) may be located on the code rendering device 602 itself. In some implementations, the location database 688 may be located both on the server 640 and on the code rendering device 602. For example, the code rendering device 602 may include a local cache 689 with items that have previously been downloaded from the location database 688. The code rendering device 602 may be configured to search first in the local cache 689 for codes 606 relevant to the current location of the code rendering device 602. If no codes 606 are found, the location database 688 on the server 640 may then be queried.

Figure 7:
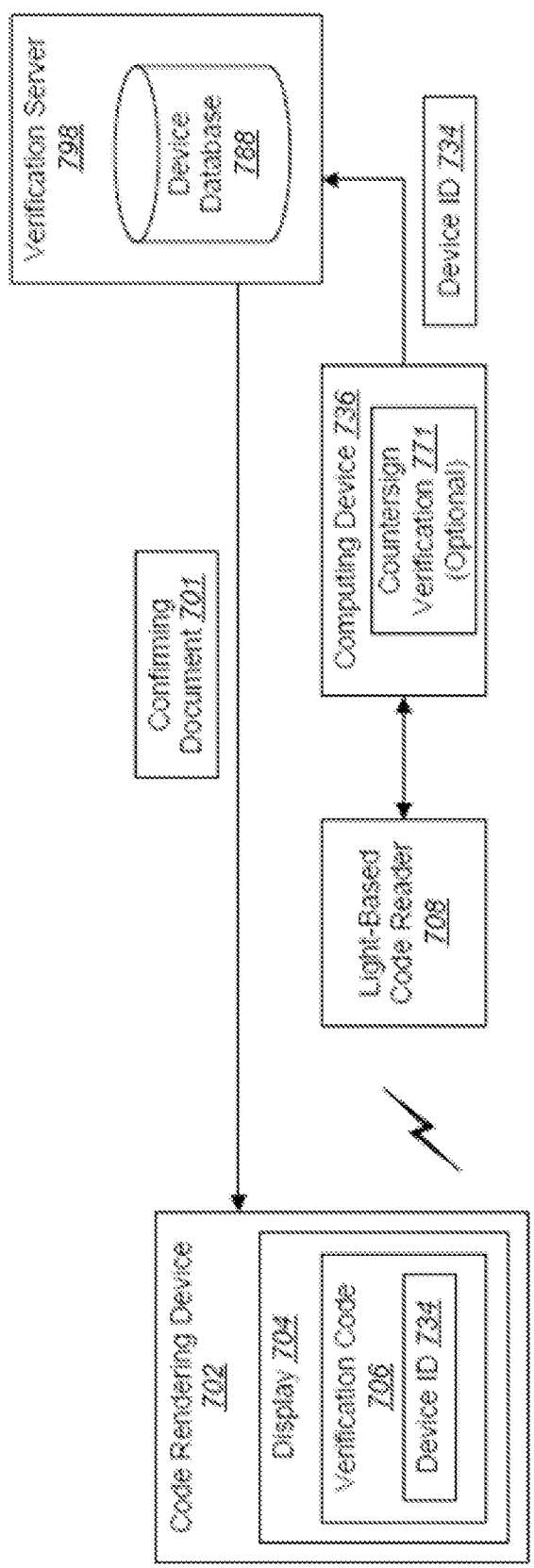
FIG. 7 illustrates an example showing how a code rendering device may be used to verify a person's identity.

FIG. 7 illustrates an example showing how a code rendering device 702 may be used to verify a person's identity. The code rendering device 702 may include the various components that are shown in connection with the code rendering device 102 of FIG. 1, including an electronic paper display 704.

The code rendering device 702 may include a machine-readable code 706 that includes a device identifier (ID) 734. The device ID 734 may uniquely identify the code rendering device 702. The code 706 may be protected against unauthorized access (e.g., password-protected), so that unauthorized users of the code rendering device 702 would not be able to access the code 706 or display it on the electronic paper display 704. The code 706 may be referred to herein as a verification code 706.

A device database 788, which may be part of a verification server 798, may include an association between the device ID 734 for the code rendering device 702 and a communication address for the code rendering device 702. The device database 788 may also include similar information for other code rendering devices.

A person who wishes to have the device ID 734 associated with his/her code rendering device 702 added to the device database 788 may be required to provide appropriate identification of his/her identity, as well as proof that he/she is the owner of the code rendering device 702. This information may be provided as part of the initial purchase of the code rendering device 702 (e.g., as part of a product registration process).

Suppose that the user of the code rendering device 702 needs to verify his/her identity. The user may cause the verification code 706 to be displayed on the electronic paper display 704 of the code rendering device 702 (e.g., by using one or more input device(s) 130). The person(s) who is/are requesting verification of the user's identity may use a light-based code reader 708 to read the machine-readable code 706.

The code reader 708 may be connected to a computing device 736. In response to the code 706 being read, the computing device 736 may send the device ID 734 to the verification server 798. The verification server 798 may determine the communication address that is associated with the device ID 734. This information may be saved in the device database 788. The verification server 798 may then send a confirming document 701 to the communication address that is associated with the device ID 734. If the confirming document 701 is received by the same code rendering device 702 from which the verification code 706 was read, this may be considered to be verification of the user's identity. The code rendering device 702 may receive the confirming document 701 via the wireless transceiver 120.

In some situations, the user of the code rendering device 702 may also be required to provide a countersign in addition to providing the verification code 706 on the code rendering device 702 itself. The countersign may be considered to be additional evidence for verifying the identity of the user. For example, the countersign may be a pin number, a signature, etc., that is not present on the code rendering device 702. The computing device 726 may include a countersign verification module 771 for processing and verifying the countersign that is provided by the user.

The verification method that is depicted in FIG. 7 may be used in a variety of different situations. For example, the verification method may be used when a person is picking up an item that has been purchased online. Often, a person who is picking up an item that has been purchased online may be required to present a valid form of identification, such as a driver's license. The verification method of FIG. 7 may be used as an alternative in some situations.

Figure 8:
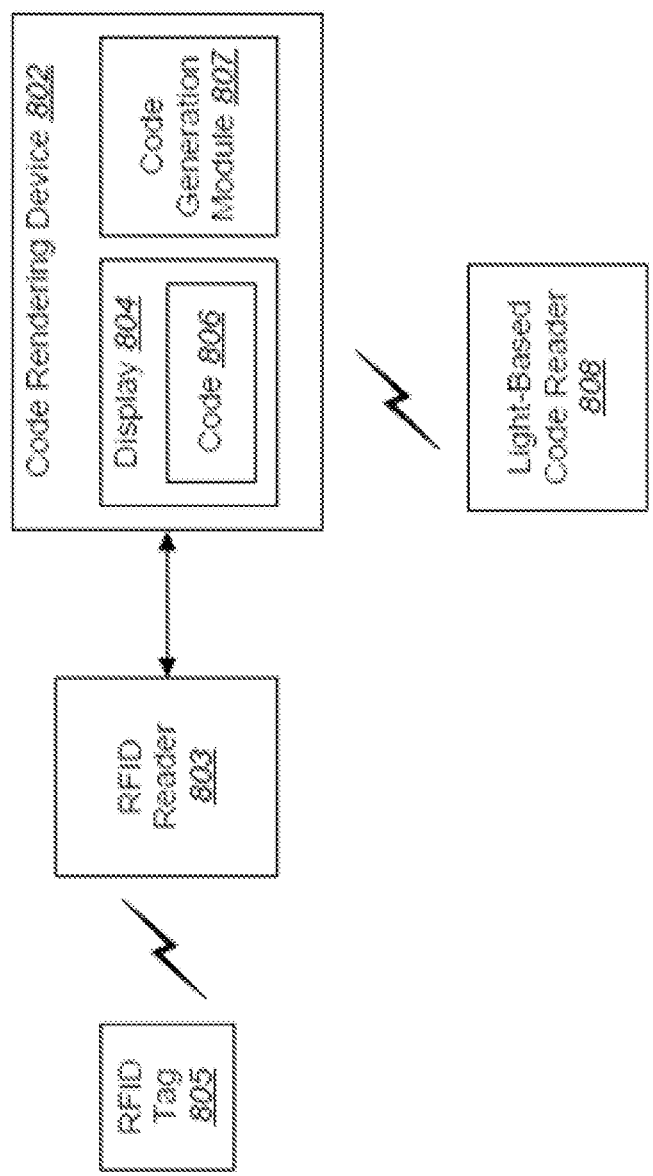
FIG. 8 illustrates an example showing how a code rendering device may be used as a bridge.

FIG. 8 illustrates an example showing how a code rendering device 802 may be used as a bridge. The code rendering device 802 may include the various components that are shown in connection with the code rendering device 102 of FIG. 1, including an electronic paper display 804.

A radio frequency identification (RFID) tag reader 803 may be connected to the code rendering device 802 (e.g., through the communication interface 124 of the code rendering device 802). The RFID tag reader 803 may be configured to read RFID tags 805.

The code rendering device 802 may include a code generation module 807. The code generation module 807 may be configured to convert information into machine-readable codes 806. The code generation module 807 may be stored within the memory 114 of the code rendering device 802 and executed by the processor 112. Alternatively, the code generation module 807 may be implemented at least partially in firmware and/or hardware.

When the RFID reader 803 reads an RFID tag 805, the information that is contained within the RFID tag 805 may be decoded and sent to the code rendering device 802. The code generation module 807 may convert this information into a machine-readable code 806, which may be saved (e.g., in non-volatile storage 126) for subsequent display on the electronic paper display 804 of the code rendering device 802.

At some subsequent point in time (e.g., when the RFID reader 803 is no longer available to read the RFID tag 805), a light-based code reader 808 may be used to read the machine-readable code 806. Thus, the information that was originally contained within the RFID tag 805 may subsequently be obtained by reading a machine-readable code 806 off of the electronic paper display 804 of the code rendering device 802. In this way, the code rendering device 802 may serve as a bridge between RFID technology and machine-readable codes 806.

RFID technology is used for illustration purposes in FIG. 8. However, a code rendering device 802 as described herein may be used as a bridge to any technology involving machine-readable tags.

As used herein, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The steps of a method or algorithm described herein may be embodied in a software module executed by a processor, in firmware, in hardware, or in a combination thereof. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

If the methods described herein are implemented in software, the software may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), high definition DVD, floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method comprising:
   determining a first location of a portable electronic device using a Global Positioning System (GPS) receiver of the portable electronic device;
   sending, to at least one server, a request for information about a first product, the request including GPS data representing the first location;
   receiving, from the at least one server and based at least in part on the request, product information associated with the first product, the product information including a second location of a store close to the first location and an indication of a third location of the first product within the second location of the store, wherein the store sells the first product;
   displaying the product information associated with the first product on an electronic display of the portable electronic device, the product information further including a first machine-readable code associated with the first product and readable by one or more light-based code readers at the store;
   receiving, from the at least one server, a second machine-readable code associated with a transaction to complete a purchase of the first product;
   displaying the second machine-readable code on the electronic display such that the second machine-readable code is readable by the one or more light-based code readers at the store;
   displaying a confirmation document on the electronic display such that the confirmation document is readable by the one or more light-based code readers at the store to confirm an online purchase of a second product; and
   obtaining, from the at least one server and based at least in part on the one or more light-based code readers at the store reading the first machine-readable code and the second machine-readable code, a receipt indicating the purchase of the first product.

2. The method of claim 1, wherein the first machine-readable code is an identifier of the portable electronic device and the second machine-readable code corresponds to a coupon related to the first product.

3. The method of claim 1, wherein at least one light-based code reader of the one or more light-based code readers is connected to a point-of-sale computing device.

4. The method of claim 3, further comprising obtaining, via the portable electronic device at the second location and from the point-of-sale computing device, a second receipt indicating a second purchase of a third product.

5. The method of claim 4, wherein the second receipt is obtained based at least in part on the second purchase being completed subsequent to the one or more light-based code readers reading a third machine-readable code.

6. The method of claim 1, wherein the receipt is a first receipt, the method further comprising:

obtaining a second receipt indicating a second purchase of a third product by a user of the portable electronic device; and displaying the second receipt by the electronic display of the portable electronic device.

7. The method of claim 1, wherein the purchase of the first product is completed based at least in part on additional information including a countersign received via a computing device connected to the at least one server, to verify an identity of a user of the portable electronic device.

8. The method of claim 1, wherein the purchase of the first product is completed based at least in part on additional information including a countersign being received via a computing device connected to the least one server, the computing device being at a fourth location close to the first location, the countersign being verified by a countersign verification module of the computing device.

9. The method of claim 1, wherein the receipt obtained from the at least one server is based at least in part on a paper copy of the receipt being scanned and sent to the at least one server for subsequent recall.

10. A portable electronic device comprising:
a processor;
an electronic display; and
memory accessible to the processor, the memory including one or more computer readable media comprising computer executable instructions that, when executed by the processor, perform acts comprising:
determining a first location of the portable electronic device;
sending, to at least one server, a request for information about a first product, the request including location data representing the first location;
receiving, from the at least one server and based at least in part on the request, product information associated with the first product, the product information including a second location of a store close to the first location and an indication of a third location of the first product within the second location of the store, wherein the store sells the first product;
displaying the product information associated with the first product on an electronic display of the portable electronic device, the product information further including a first machine-readable code associated with the first product and readable by one or more light-based code readers at the store;
receiving, from the at least one server, a second machine-readable code associated with a transaction to complete a purchase of the first product;
displaying the second machine-readable code on the electronic display such that the second machine-readable code is readable by the one or more light-based code readers at the store;
displaying a confirmation document on the electronic display such that the confirmation document is readable by the one or more light-based code readers at the store to confirm an online purchase of a second product; and
obtaining, from the at least one server and based at least in part on the one or more light-based code readers at the store reading the first machine-readable code and the second machine-readable code, a receipt indicating the purchase of the first product.

11. The portable electronic device of claim 10, wherein the first location of the portable electronic device is determined using a Global Positioning System (GPS) receiver of the portable electronic device.

12. The portable electronic device of claim 10, wherein the acts further comprise:
sending a query to the at least one server for an additional machine-readable code corresponding to an additional product; and
receiving, from the at least one server, additional code data representing the additional machine-readable code.

13. The portable electronic device of claim 10, wherein the acts further comprise:
receiving additional information from a product database stored on a server; and
converting the additional information to an additional machine-readable code.

14. The portable electronic device of claim 10, wherein the electronic display is an electronic paper display.

15. The portable electronic device of claim 10, wherein the first machine-readable code is a one-dimensional machine-readable code or a two-dimensional machine-readable code.

16. The portable electronic device of claim 10, wherein the acts further comprise obtaining, from a point-of-sale computing device to which the one or more light-based code readers are connected, a second receipt indicating a second purchase of a third product, wherein the second receipt is obtained based at least in part on the second purchase being completed subsequent to the one or more light-based code readers reading a third second machine-readable code.

17. The portable electronic device of claim 10, wherein the purchase of the first product is completed based at least in part on additional information including a countersign being received via a computing device connected to the least one server, the computing device being at a fourth location close to the first location, the countersign being verified by a countersign verification module of the computing device.

18. An apparatus comprising:
a processor;
an electronic display;
a user input device;
a wireless transceiver; and
memory accessible to the processor, the memory including one or more computer readable media comprising computer executable instructions that, when executed by the processor, perform acts comprising:
accessing first code data representing a first machine-readable code stored in the memory;
receiving input via the user input device;
displaying the first machine-readable code on the electronic display;
determining a first location of the apparatus;
sending, to at least one server, a request for information about a first product, the request including location data representing the first location;
receiving, from the at least one server and based at least in part on the request, product information associated with the first product, the product information including a second location of a store close to the first location and an indication of a third location of the first product within the second location of the store, wherein the store sells the first product;
receiving, from the at least one server, second code data representing a second machine-readable code associated with a transaction to complete a purchase of the first product;
displaying, in response to receiving the product information and the second code data, the product information associated with the first product on the electronic display, the product information further including the second machine-readable code;

displaying a confirmation document on the electronic display such that the confirmation document is readable at the store to confirm an online purchase of a second product; and obtaining, from the at least one server and based at least in part on the first machine-readable code and the second machine-readable code being read at the store, a receipt indicating the purchase of the first product.

19. The apparatus of claim 18, wherein the acts further comprise:

receiving radio frequency identification (RFID) information; and converting the RFID information to an additional machine-readable code.

20. The apparatus of claim 18, wherein the receipt is obtained from a point-of-sale computing device at a fourth location close to the first location.

\* \* \* \* \*